US010592929B2

(12) United States Patent
Steube et al.

(10) Patent No.: US 10,592,929 B2
(45) Date of Patent: Mar. 17, 2020

(54) SYSTEMS AND METHODS FOR DELIVERING CONTENT

(71) Applicant: VP Holdings, Inc., St. Petersburg, FL (US)

(72) Inventors: Fred Steube, Atlanta, GA (US); Michael Vivio, Atlanta, GA (US); James Christian Cate, Atlanta, GA (US)

(73) Assignee: VP Holdings, Inc., St. Petersburg, FL (US)

( * ) Notice: Subject to any disclaimer, the term of this patent is extended or adjusted under 35 U.S.C. 154(b) by 63 days.

(21) Appl. No.: 14/313,728

(22) Filed: Jun. 24, 2014

(65) Prior Publication Data

US 2015/0235267 A1 Aug. 20, 2015

Related U.S. Application Data

(60) Provisional application No. 61/941,934, filed on Feb. 19, 2014.

(51) Int. Cl.
*G06F 17/20* (2006.01)
*G06Q 30/02* (2012.01)
(Continued)

(52) U.S. Cl.
CPC ..... *G06Q 30/0261* (2013.01); *G06K 9/00671* (2013.01); *G06Q 30/0251* (2013.01);
(Continued)

(58) Field of Classification Search
CPC .... G06F 17/211; G06F 17/2247; G06F 17/24; G06Q 30/0251
See application file for complete search history.

(56) References Cited

U.S. PATENT DOCUMENTS 8,180,107 B2 5/2012 Broaddus et al.
9,058,764 B1 * 6/2015 Persson ................... G09G 5/14
(Continued)

OTHER PUBLICATIONS http://blippar.com/about as printed on Jun. 24, 2014.
(Continued)

*Primary Examiner* — Shahid K Khan
(74) *Attorney, Agent, or Firm* — Howard & Howard Attorneys PLLC

(57) ABSTRACT

The present disclosure relates to computer-implemented systems and methods for delivering content. An example method may include receiving ambient environment information associated with a user device, the ambient environment information comprising image information for an image having multiple objects positioned within the image, and identifying a user associated with the user device. The method may include identifying a user category associated with the user, and identifying at least two of the objects positioned within the image based at least in part on the image information. The method may include identifying one or more triggers based at least in part on the at least two objects, and identifying, based at least in part on the one or more triggers, at least one marketing message associated with the one or more triggers, the ambient environment information, and the user category. The method may include sending the marketing message to the user device.

19 Claims, 4 Drawing Sheets

(51) Int. Cl.
  *G06K 9/00* (2006.01)
  *H04N 21/234* (2011.01)
  *H04N 21/81* (2011.01)
  *H04N 21/422* (2011.01)
  *H04N 21/258* (2011.01)
  *H04N 21/4223* (2011.01)

(52) U.S. Cl.
  CPC ..... *G06Q 30/0267* (2013.01); *G06Q 30/0269* (2013.01); *H04N 21/23418* (2013.01); *H04N 21/25808* (2013.01); *H04N 21/422* (2013.01); *H04N 21/4223* (2013.01); *H04N 21/42201* (2013.01); *H04N 21/42202* (2013.01); *H04N 21/42203* (2013.01); *H04N 21/812* (2013.01)

(56) References Cited

U.S. PATENT DOCUMENTS

| | | | |
|---|---|---|---|
| 2002/0130899 A1* | 9/2002 | Ryan | G06Q 30/02 715/738 |
| 2003/0113109 A1* | 6/2003 | Pelletier | G03B 17/24 396/321 |
| 2005/0289590 A1* | 12/2005 | Cheok | G06Q 30/02 725/37 |
| 2009/0054084 A1 | 2/2009 | Buhrke et al. | |
| 2009/0081959 A1 | 3/2009 | Gyorfi et al. | |
| 2009/0111434 A1 | 4/2009 | Yu et al. | |
| 2009/0167787 A1* | 7/2009 | Bathiche | A63F 13/10 345/633 |
| 2009/0237328 A1 | 9/2009 | Gyorfi et al. | |
| 2010/0066750 A1 | 3/2010 | Yu et al. | |
| 2010/0194782 A1 | 8/2010 | Gyorfi et al. | |
| 2010/0214111 A1 | 8/2010 | Schuler et al. | |
| 2012/0231425 A1* | 9/2012 | Calman | G06Q 30/0261 434/93 |
| 2013/0079142 A1* | 3/2013 | Kruglick | G06Q 30/0251 463/40 |
| 2013/0095855 A1 | 4/2013 | Bort | |
| 2013/0195322 A1* | 8/2013 | Santhiveeran | G06Q 30/0251 382/118 |
| 2013/0293580 A1* | 11/2013 | Spivack | G06Q 30/0643 345/633 |
| 2014/0022248 A1 | 1/2014 | Kuffner, Jr. et al. | |
| 2014/0078318 A1 | 3/2014 | Alameh | |
| 2014/0100994 A1* | 4/2014 | Tatzel | G06Q 30/0268 705/27.1 |
| 2014/0118479 A1 | 5/2014 | Rapoport et al. | |
| 2014/0123041 A1 | 5/2014 | Morse et al. | |
| 2015/0206343 A1* | 7/2015 | Mattila | G06T 17/05 345/420 |

OTHER PUBLICATIONS http://www.t-immersion.com/augmented-reality/use-cases as printed on Jun. 24, 2014.
http://www.aurasma.com/aura/ as printed on Jun. 24, 2014.
http://thenextweb.com/la/2012/02/12/crossfy-wants-to-cross-the-bridge-between-print-and-digital-media/ as printed on Jun. 24, 2014.
http://www.qualcomm.com/solutions/augmented-reality as printed on Jun. 24, 2014.
http://www.marxentlabs.com/ as printed on Jun. 24, 2014.
http://www.inglobetechnologies.com/docs/whitepapers/AR_printing_whitepaper_en.pdf as printed on Jun. 24, 2014.
http://www.youtube.com/watch?v=glQxQW46XXo&list=PL289D02B927F58D61&index=1 as printed on Jun. 24, 2014.
http://www.perey.com/Mobile_AR_in_Publishing.html as printed on Jun. 24, 2014.
http://www.buildar.co.nz/downloads/BuildAR_Tutorial_PDF2_en.pdf as printed on Jun. 24, 2014.
https://www.youtube.com/watch?v=MN46r-IZk8o as printed on Jul. 2, 2014.
http://www.youtube.com/watch?v=RA4mOn8EJyo as printed Jun. 24, 2014.
http://www.youtube.com/watch?v=ThUQyi0BO_k as printed Jun. 24, 2014.
http://www.youtube.com/watch?v=dTk_9pmqspE as printed Jun. 24, 2014.
http://www.youtube.com/watch?v=pyj-S2Yqh8l as printed Jun. 24, 2014.
http://daqri.com/daqri-4d-studio/#.U6h4w_ldX9w as printed Jun. 24, 2014.
http://www.daqri.com/portfolio/#.Uffzko21GSo as printed Jun. 24, 2014.
http://www.hdinteractive.com/development.php as printed Jun. 24, 2014.
http://www.hdiblog.com/2010/03/valpak-rolls-out-augmented-reality-codes-in-martha-stewart-print-campaign/ as printed Jun. 24, 2014.
http://www.layar.com/what-is-layar/ as printed Jun. 24, 2014.
http://www.metaio.com/products/ as printed Jun. 24, 2014.

* cited by examiner

SYSTEMS AND METHODS FOR DELIVERING CONTENT

CROSS-REFERENCE TO RELATED APPLICATION

This application claims the priority benefit of U.S. Provisional Application No. 61/941,934, entitled "Systems and Methods for Delivering Content," filed Feb. 19, 2014.

TECHNICAL FIELD

The present disclosure generally relates to systems and methods for delivering content, and more specifically, to systems and methods for delivering content to users.

BACKGROUND

Consumer interaction may lead to increased awareness between consumers and brands. Increased interaction between consumers and brands may engage consumers and may therefore lead to more effective forms of advertising. Accordingly, delivering content that may encourage or improve consumer interaction experiences, as well as engagement between brands and consumers, may be desired.

BRIEF DESCRIPTION OF THE DRAWINGS

Reference will now be made to the accompanying figures and diagrams, which are not necessarily drawn to scale, and wherein.

SUMMARY

Figure 1:
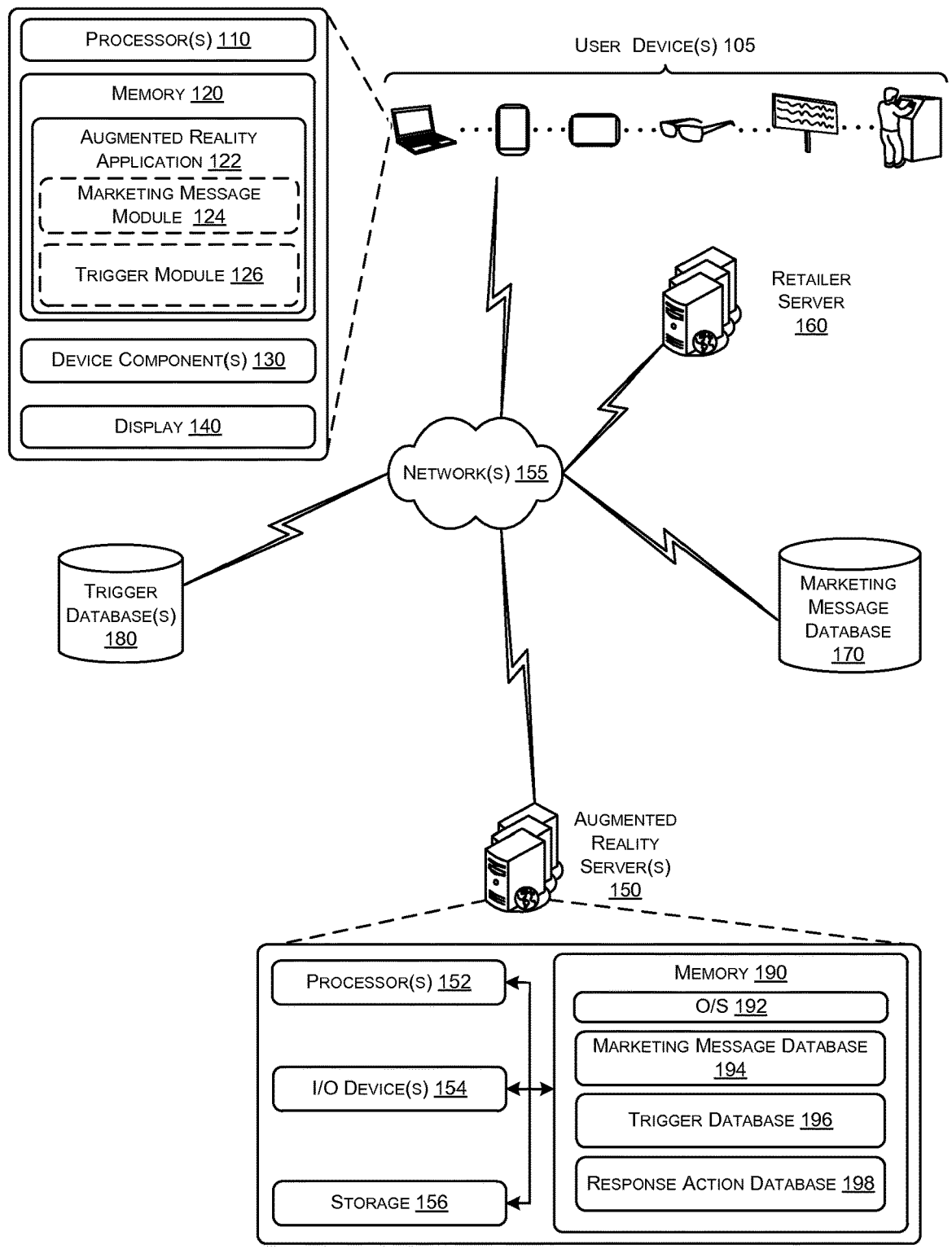
FIG. 1 depicts a system for delivering content, according to one or more example embodiments.

According to one embodiment, an example method may include receiving ambient environment information associated with a user device, the ambient environment information comprising image information for an image having multiple objects positioned within the image, and identifying a user associated with the user device. The method may include identifying a user category associated with the user, and identifying at least two of the objects positioned within the image based at least in part on the image information. The method may include identifying one or more triggers based at least in part on the at least two objects, and identifying, based at least in part on the one or more triggers, at least one marketing message associated with the one or more triggers, the ambient environment information, and the user category. The method may include sending the marketing message to the user device.

According to another embodiment, a user device may include at least one memory storing computer-executable instructions, and at least one processor configured to execute the computer-executable instructions. When executed, the processor may cause the user device to transmit ambient environment information of the user device to a computer, wherein the ambient environment information is obtained using a device component of the user device. The processor may further cause the user device to receive a response action from the computer, the response action based at least in part on the ambient environment information, and to execute the response action. The processor may further cause the user device to present a marketing message to a user of the user device, based at least in part on the response action.

According to another embodiment, a non-transitory computer readable medium storing instructions, that when executed by at least one processor, causes the at least one processor to receive ambient environment information associated with a user device, the ambient environment information comprising image information for an image having multiple objects positioned within the image, and identifying a user associated with the user device. The processor may identify a user category associated with the user, and identify at least two of the objects positioned within the image based at least in part on the image information. The processor may identify one or more triggers based at least in part on the at least two objects, and may identify, based at least in part on the one or more triggers, at least one marketing message associated with the one or more triggers, the ambient environment information, and the user category. The processor may be configured to send the marketing message to the user device.

DETAILED DESCRIPTION

In the following description, numerous specific details are set forth. However, it should be understood that embodiments of the present disclosure may be practiced without these specific details. In other instances, well-known methods, structures, and techniques have not been shown in detail in order not to obscure an understanding of this description. References to "one embodiment," "an embodiment," "example embodiment," "various embodiments," and so forth indicate that the embodiment(s) of the present disclosure so described may include a particular feature, structure, or characteristic, but not every embodiment necessarily includes the particular feature, structure, or characteristic. Furthermore, the repeated use of the phrase "in one embodiment" does not necessarily refer to the same embodiment, although it may.

As used herein, unless otherwise specified, the use of the ordinal adjectives "first," "second," "third," etc., to describe a common object merely indicates that different instances of like objects are being referred to and are not intended to imply that the objects so described must be in a given sequence, either temporally, spatially, in ranking, or in any other manner.

As used herein, unless otherwise specified, the term "device" refers, in general, to an electronic communication device, both wired and wireless, and more particularly to one or more of the following: a portable electronic device, a telephone (e.g., cellular phone, smartphone), a computer (e.g., laptop computer, tablet computer, desktop computer, wearable computer, portable computer), a portable media player, a personal digital assistant (PDA), a kiosk computer for public use, a point of sale display, a smart billboard or poster, an internet connected kiosk, entertainment/gaming system, web-enabled television, or any other electronic device having a networked capability.

As used herein, unless otherwise specified, the term "server" may refer to any computing device having a networked connectivity and configured to provide one or more dedicated services to clients, such as a mobile device. The services may include storage of data or any kind of data processing. One example of a central server may include a web server hosting one or more web pages. Some examples of web pages may include social networking web pages. Another example of a server may be a cloud server that hosts web services for one or more computer devices.

As used herein, unless otherwise specified, the term "network" may correspond to various types of networks capable of communicating via one or more communication interfaces. Such communication interfaces may include, but are not limited to: personal area networks (PANs), wired local area networks (LANs), wireless local area networks (WLANs), wireless wide area networks (WWANs), and other wired and wireless system interfaces. To this end, the wireless system interfaces may include the hardware and software to broadcast and receive messages either using the Wi-Fi Direct Standard (see Wi-Fi Direct specification published in October 2010) and/or the IEEE 802.11 wireless standard (see IEEE 802.11-2007, published Mar. 8, 2007; IEEE 802.11n-2009, published October 2009), or a combination thereof. Furthermore, the communication interfaces may utilize acoustic, radio frequency, optical, or other signals to exchange data between a user device, as described herein, and another device such as an access point, a host computer, a server, a router, a reader device, and the like. Additionally, the network may include, but is not limited to: the Internet, a private network, a virtual private network, a wireless wide area network, a local area network, a metropolitan area network, a telephone network, a cellular network (e.g., Global System for Mobile, Code Division Multiple Access, Long-Term Evolution, and/or Long-Term Evolution Advanced networks) and so forth.

As used herein, unless otherwise specified, the term "web page" may correspond to one or more web pages as part of one or more websites.

Embodiments of the present disclosure may generally relate to delivering relevant content to consumers. Delivered content may be based on inputs provided either actively or passively from a consumer, or from a user device associated with a consumer. The delivered content may be, for example, augmented reality in the form of an advertisement, a marketing message, information, or other forms of content as described herein. The delivered content may be overlayed onto existing real world images, for example, to provide augmented reality content. In some instances, content may be delivered to a user device associated with a consumer based on ambient environment information collected contemporaneously or over a predetermined time period. The collected ambient environment information may be stored and/or associated with the consumer. Content may be delivered automatically or upon request from a consumer and may be based on certain triggers as discussed herein. Content for delivery may be identified in part based on specific users, or specific user categories a user may fall into. For example, owners of Sport Utility Vehicles may receive different content than owners of convertibles. In another example, middle aged men may receive different content than young women.

The systems and methods described herein may "map" or overlay digital or virtual images, shapes, and/or patterns into a mobile application, and execute associated response actions. For example, a user may scan an image or other device sensors may recognize location, date/time, weather conditions (or other environmental conditions such as lighting) via the mobile application, as part of the systems and methods described herein, using a mobile device camera or other sensors and device feature sets, causing the associated response action to occur. The systems and methods described herein may recognize real world and/or digital images (users, faces, print, billboard, window clings, posters, electronic display, TV, smartphone, tablet, monitor, etc.) and execute a response action via, for example, a camera-enabled device (smartphone, tablet, camera-embedded laptop, Wi-Fi enabled cameras, smart watches, glasses and contact lenses, smart billboards, kiosks, etc.). The response action may include presenting a coupon, article, lead form, video, social media content overlay, map, audio file, or sending an email, tweet/share/like/+1, etc. The systems and methods described herein may load a digitized image and/or recognize a pattern, (shapes could be in scope, for example a door with standard 6'8" height and 30", 32", 36", etc. width) and execute a specific response action.

For example, some embodiments may include a user device associated with a consumer communicatively coupled to an augmented reality server. Some embodiments may further include a third-party server and/or a retailer server in communication with the user device and the augmented reality server over a network. A user of the user device, such as a consumer, may use a component of the user device, such as a camera or location sensor, to provide ambient environment information to the augmented reality server via a mobile application with a user interface. The augmented reality server may receive the ambient environment information, such as an image captured via the camera. The augmented reality server may identify a user associated with the user device, for example via contextual inputs or a registration process, and may identify a user category associated with the user. For example, user categories may be based on age, gender, purchase histories, location, preferences, or other factors. The augmented reality server may identify a trigger in the received ambient environment information, for example the received image. The image may include a storefront for a specific store, a luxury vehicle, or waves at a beach. The augmented reality server may identify the storefront, vehicle, or waves and transmit a marketing message or link to a marketing message, for example a promotional offer for a discount at the specific store or a discount on beach towels, to the user device. The mobile application may prompt the consumer to accept or use the promotional offer. Additional embodiments and examples are discussed herein.

According to one or more embodiments, an augmented reality server may include an advertisement database, for example a marketing message database, a trigger database, and/or an action database. The augmented reality server may receive ambient environment information from a user device and identify a trigger based at least in part on the received ambient environment information. For example, the augmented reality server may analyze the ambient environment information to determine a trigger based on triggers stored in the trigger database. Such triggers may include, but are not limited to, images, sounds, motions, biometric information, and other triggers as discussed herein. The augmented reality server may further determine, based at least in part on the trigger, an advertisement such as a marketing message, selected from the marketing message database, associated with the trigger. For example, the marketing message may be a discount on a particular item or at a specific store. The augmented reality server may transmit the marketing message or otherwise cause the marketing message to be sent to the user device, and may instruct the mobile application that may be stored on the user device to prompt the user to accept the marketing message. In other embodiments, the augmented reality server may determine an action, selected from the action database, associated with the trigger. For example, an action may include launching a short video on the user device. In one instance, the augmented reality server may transmit the short video, or otherwise transmit instructions to launch the video, to the user device. In some embodiments, the augmented reality server may identify both a marketing message and an action associated with the trigger, and may transmit one or both to the user device.

In some embodiments, the augmented reality server may determine an action, selected from the action database, associated with an identified trigger. The action may include presenting an image, for example, overlayed on realtime images visible via a camera and display of the user device. In other embodiments, other components of the user device may be used as discussed herein. For example, a user may initiate the mobile application which may be stored on the user device. The mobile application may use the camera of the user device to present realtime images on the display of the user device. The user may point the camera or otherwise capture, for example a scannable barcode, or another real-world pattern, such as a door frame or furniture, using the user device. The user device may transmit the ambient environment information, in this example the images captured through the camera of the user device, to the augmented reality server. The augmented reality server may identify a user associated with the user device, and identify a user category associated with the user. The augmented reality server may identify, based at least in part on the ambient information, the furniture, for example a table, as a trigger. The augmented reality server may determine an action, selected from the action database, associated with the trigger. The action may be, for example, to present an overlayed virtual image of a lamp positioned on the real-world table. Other examples may include loading a website, loading a multimedia file, serving an advertisement, marketing message, promotional offer, or the like as described herein. In this manner, the augmented reality server may augment the real-world and realtime image of the table to include a virtual lamp positioned on the table, as viewed by the user on the display of the user device. In some embodiments, the trigger database, the action database, and/or the marketing message database, may be stored remotely rather than at the augmented reality server, as discussed herein. In such instances, the augmented reality server may access and/or communicate with various sources or servers to determine actions, triggers, or marketing messages to present to the consumer.

According to certain implementations, the augmented reality server may deliver content to a user. Such content may be relevant to a user in that the content may be based at least in part on ambient environment information transmitted from a user device associated with the user to the augmented reality server. For instance, ambient environment information may include an image of a storefront of a specific store or merchant. The augmented reality server may receive the ambient environment information and identify a trigger, if any, associated with the ambient environment information. Identification of such triggers may be facilitated by a trigger database stored on or otherwise in communication with the augmented reality server. The augmented reality server may further determine a response action, which may be selected from an action database stored on or otherwise in communication with the augmented reality server. The augmented reality server may further communicate a response action to the user device, and the user device may prompt the user or otherwise execute the response action received from the augmented reality server.

Thus, according to one or more embodiments of the disclosure, a method is provided. The method may include receiving, by a computer system comprising one or more processors, ambient environment information associated with a user device, and identifying one or more triggers based at least in part on the ambient environment information. The method may further include determining, based at least in part on the one or more triggers, a response action associated with the one or more triggers. The response action may include a communication to the user device. The communication may include a prompt on a user interface of the user device.

According to one or more embodiments of the disclosure, a system is provided. The system may have at least one processor and at least one memory storing computer-executable instructions. When the instructions are executed by the at least one processor, the instructions may cause the at least one processor to receive ambient environment information associated with a user device, and identify one or more triggers based at least in part on the ambient environment information. The instructions may also cause the at least one processor to determine, based at least in part on the one or more triggers, a response action associated with the one or more triggers. The response action may include a communication to the user device. The communication may include a prompt on a user interface of the user device.

According to one or more embodiments of the disclosure, a non-transitory computer-readable medium is provided. The non-transitory computer-readable medium may have embodied thereon instructions executable by at least one processor. The instructions may cause the one or more processors to receive ambient environment information associated with a user device, and identify one or more triggers based at least in part on the ambient environment information. The instructions may also cause the at least one processor to determine, based at least in part on the one or more triggers, a response action associated with the one or more triggers. The response action may include a communication to the user device. The communication may include a prompt on a user interface of the user device.

The above principles, and others, are now illustrated with reference to FIG. 1, which depicts a system 100 for delivering content according to one or more embodiments of the present disclosure. The system 100 may include one or more user devices 105 in communication with an augmented reality server 150 via a network 155. The system 100 may optionally include a retailer server 160, a marketing message database 170, and a trigger database 180 in communication with each other and the user device 105 and augmented reality server 150 via network 155. In some embodiments, the marketing message database 170 and the trigger database 180 may be stored remotely and accessible by the augmented reality server 150, while in other embodiments, the marketing message database 194 and/or the trigger database 196 may be stored at the augmented reality server 150. The trigger databases 180, 196 may be the same database but may be stored in different locations or accessed by different components of the system.

The user device 105 may include one or more processors 110 in communication with a memory 120. The memory 120 may include one or more computer-readable storage media (CRSM). In some embodiments, the memory 120 may include non-transitory media such as random access memory (RAM), flash RAM, magnetic media, optical media, solid state media, and so forth. The memory 120 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory may store an operating system that includes a plurality of computer-executable instructions that may be implemented by the computer processor to perform a variety of tasks to operate the interface(s) and any other hardware installed on the user device 105. The memory may also store content that may be displayed by the user device 105 or transferred to other devices (e.g., headphones) to be displayed or played by the other devices. The memory may also store content received from the other devices. The content from the other devices may be displayed, played, or used by the user device 105 to perform any necessary tasks or operations that may be implemented by the computer processor or other components in the user device 105.

The computer processors 110 may comprise one or more cores and may be configured to access and execute (at least in part) computer-readable instructions stored in the memory 120. The one or more computer processors 110 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 105 may also include a chipset (not shown) for controlling communications between the one or more processors and one or more of the other components of the user device 105.

The memory 120 may store a variety of user applications and other data having instructions to be executed by the processor(s) 110. For example, the memory 120 may store an augmented reality application 122, which may include a marketing message module 124 and a trigger module 126. Furthermore, the memory 120 may also store a web browser, as described above.

The user device 105 may include multiple device component(s) 130 configured to capture ambient environment information. For example, the user device 105 may include a camera configured to capture images, and/or a microphone to capture audio. Other device components include, but are not limited to, accelerometers and/or gyroscopes configured to capture motion and or speed, global positioning satellites configured to capture user device location, biometric sensors including heartrate sensors, pulse sensors, optical or retinal scanners, and the like configured to capture biometric information of a user, and ultraviolet light sensors configured to capture ultraviolet light exposure.

The user device 105 may also include a display 140 used to display various information, such as a user interface of the augmented reality application 122, for example. Furthermore, the display 140 may include, but is not limited to, a liquid crystal display, a light-emitted diode display, a projector display, a wearable display, and/or an E-Ink™ display as made by E Ink Corp. of Cambridge, Mass. The display may be used to show or otherwise present content to a user in the form of text, images, or video. In certain instances, the display 140 may also operate as a touch screen display that may enable the user to initiate commands or operations by touching the screen using certain finger or hand gestures.

According to some embodiments, the system 100 may also include the augmented reality server(s) 150 in communication with the user device(s) 105 through one or more networks 155. The augmented reality server(s) 150 may include processor(s) 152 in communication with memory 190. The memory may store an operating system 192, a marketing message database 194, a trigger database 196, and a response action database 198. The marketing message database 194 may correspond to the marketing message module 124 of the user device 105, and the trigger database 196 may correspond to the trigger module 126 of the user device 105. The marketing message databases 170, 194 may store or otherwise contain marketing messages or advertisements for specific merchants, activities, or other consumer desirable items or services. The trigger databases 180, 196 may store or otherwise contain triggers that can be used or accessed by, for example, the augmented reality server 150 or the augmented reality application 122 to identify triggers in ambient environment information and to determine particular response actions, as discussed herein. The trigger databases 180, 196 may include stored targets such as images, patterns (for example ripples on the surface of a body of water or waves), visual cues, barcodes, or other targets.

Additionally, the augmented reality server(s) 150 may include Input/Output (I/O) devices 154 and storage 156. The I/O devices 154 may include various peripheral and/or internal components including, but not limited to, keyboards, mice, displays, network interface cards, disk controllers, web cams, and/or other devices. The storage 156 may include any kind of storage devices, such as hard disk drives, solid-state drives, flash drives, tape drives, compact disc drives, DVD drives, Blu-Ray drives, network attached storage, remote storage locations, and/or the like.

As stated above, the memory 120 of the user device(s) 105 may store one or more augmented reality applications 122. In other embodiments, the augmented reality application 122 may be stored partially or entirely at the augmented reality server(s) 150, or on both the user device 105 and the augmented reality server(s) 150. Thus, it should be understood that the operations of the augmented reality application 122 may be performed by the user device 105, the augmented reality server(s) 150, and/or any combination thereof.

The retailer server 160 may be accessible by a specific retailer, and may be configured to receive marketing messages, for example from the augmented reality server 150 and/or the augmented reality application 122 on the user device 105. The retailer server 160 may be, for example, a point of sale device, a merchant side device, or otherwise accessible by retailers or merchants to receive certain marketing messages, for example at a point of sale.

Generally, the augmented reality application 122 may receive or otherwise acquire ambient environment information from one or more device components 130 of the user device 105. Ambient environment information may include any information regarding the contemporaneous surroundings or surrounding environment of the user device 105. For example, the augmented reality application 122 may receive image, video, or other visual information from a camera associated with the user device 105. In another example, the augmented reality application 122 may receive sound or audio information from a microphone associated with the user device 105. In another example, geographical or location information may be received by the augmented reality application 122 from a global positioning satellite component associated with the user device 105. In yet another example, motion or speed information may be received from an accelerometer or other motion or speed detector associated with the user device 105, as well as pitch or yaw or other orientation information. Other sources of ambient environment information may include chronological or time information received from an internal clock associated with the user device 105, and climate or weather information received from a weather source associated with the user device 105, such as a website that may push weather or climate information to the user device 105. Additional examples of ambient environment information may include user inputs, either automatically by components associated with the user device 105 or entered manually by users, for example health related information such as heart rate and pulse, which may be entered by users or detected using hardware associated with the user device 105. Further sources of ambient information may include electrical waves or brain waves, psychological or behavioral information, scents, and lightwaves or pulses, each of which may be detected by hardware associated with the user device 105. The augmented reality application 122 may receive ambient environment information from multiple sources associated with the user device 105, or from a single source associated with the user device 105.

According to one or more embodiments, the augmented reality application 122 may transmit the ambient environment information to the augmented reality server 150. The augmented reality server 150 may receive the ambient environment information and analyze the received ambient environment information or otherwise identify one or more triggers contained within or associated with the ambient environment information. The augmented reality server may also identify a user associated with the user device and identify a user category associated with the user. The augmented reality server 150 may determine, based at least in part on the one or more triggers, a response action associated with the one or more triggers. The response action may include a communication to the user device 105. The communication to the user device 105 may include a prompt on a user interface of the user device, as discussed herein.

In certain implementations, the augmented reality server 150 may identify one or more triggers by comparing received ambient environment information to triggers stored in the trigger database 196. In other implementations, the augmented reality server 150 may identify one or more triggers based on partial matches or other analysis of the received ambient environment information. Similarly, the augmented reality server 150 may determine a response action associated with the one or more triggers by selecting a response action from the response action database 198. In some embodiments, contextual information, such as date and time, location, and/or climate information may be included in the ambient environment information and analyzed by the augmented reality server 150 to determine a response action. For instance, the augmented reality server 150 may receive ambient environment information including an image of a restaurant along with date and time information indicating late evening. The augmented reality server 150 may determine a response action of overlaying, for example, dessert items on or near the image of the restaurant as the user may be at dinner and may be interested in desserts available at a nearby location. If, on the other hand, the date and time information indicated a morning hour, the augmented reality server 150 may determine a response action of overlaying coffee on or near the image of the restaurant.

In certain embodiments, a user and/or the user device 105 may have the ability to register with the augmented reality application 122, thereby associating the user with the user device 105. Registering with the augmented reality application 122 or utilizing a tracking mechanism (e.g., a browser cookie as described herein) may enable the user to store and/or access one or more preferences or other user information or user behavior information. For example, in one session with the user device 105, the augmented reality application 122 may determine the user does not like to watch videos such as video advertisements, and instead enjoys reading articles or static advertisements, while in another session with the user device 105, the augmented reality application 122 may determine the user generally accepts marketing messages. To this end, the augmented reality application 122 may deliver static advertisements with marketing messages to the user in subsequent sessions.

It should be noted that while the augmented reality application 122 has been described as a dedicated application on the user device 105, the augmented reality application 122 may also be presented as a web portal, a series of web pages, a cookie (which may be stored on the user device 105), stored on the augmented reality server 150 and/or any combination thereof. To this end, the augmented reality application 122, and/or the functionality therein, may be accessible to a user through a web browser of the user device 105.

Figure 2:
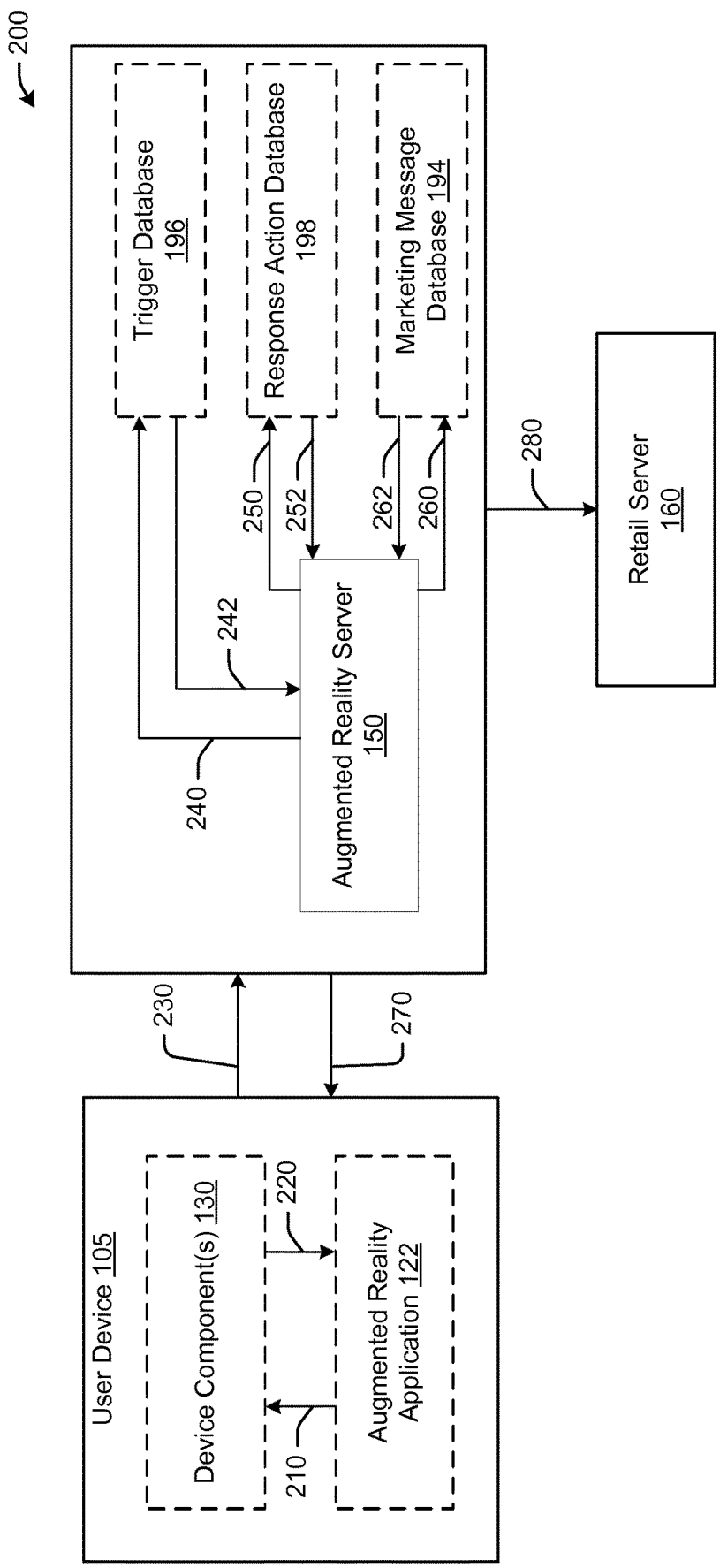
FIG. 2 depicts a data flow diagram for delivering content, according to one or more example embodiments.
Figure 3:
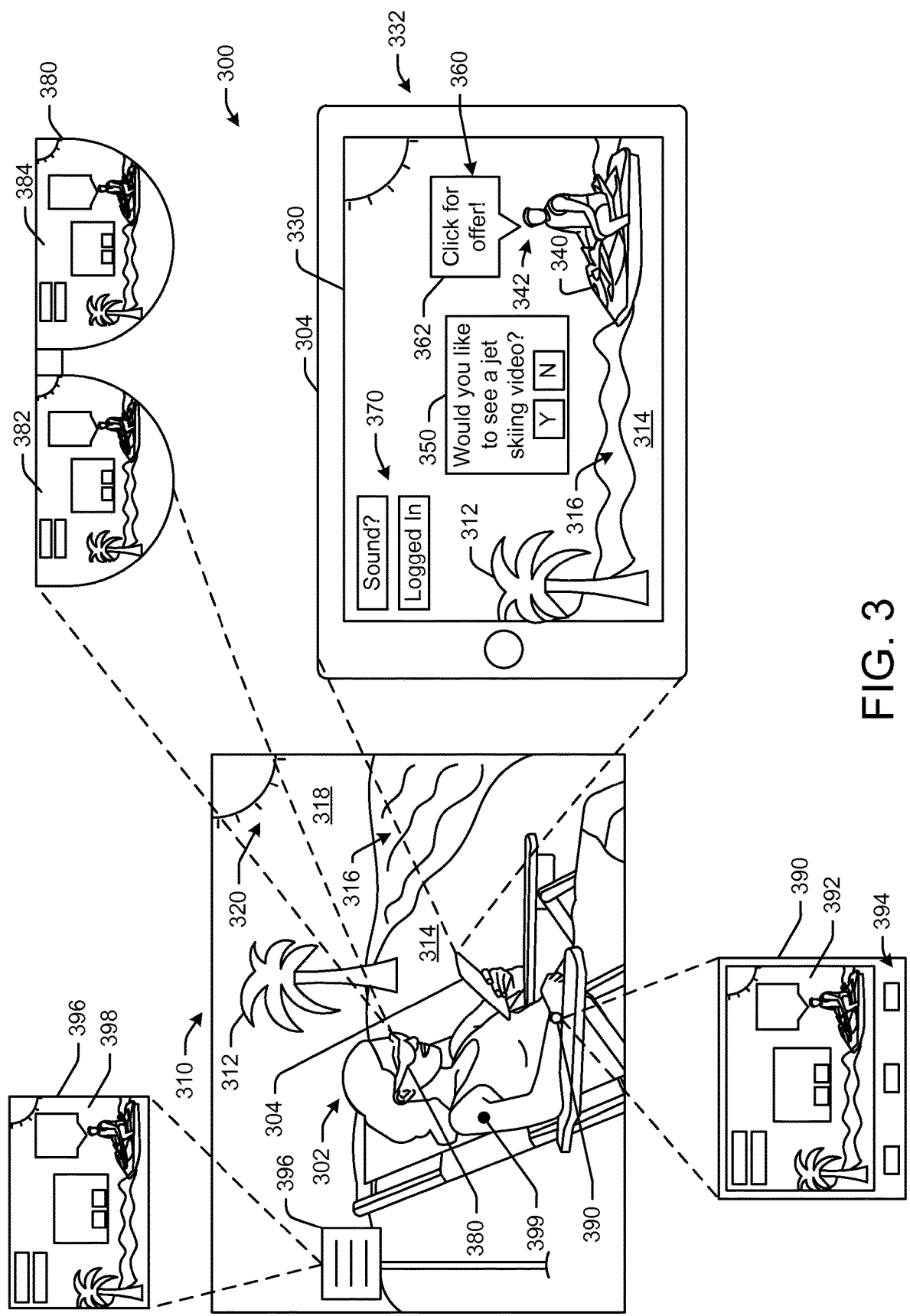
FIG. 3 depicts an example use case for delivering content, according to one or more example embodiments.

Referring now to FIGS. 2 and 3, embodiments of the disclosure are discussed in detail. FIG. 2 depicts a data flow 200 for delivering content in accordance with one or more embodiments of the present disclosure. The data flow 200 may begin when a user opens the augmented reality application 122 on the user device 105. The augmented reality application 122 may send a request for ambient environment information 210 to one or more device component(s) 130. The device component 130 may receive the request for ambient environment information from the augmented reality application 122 and, in response, the device component 130 of the user device 105 may input, or otherwise provide, ambient environment information 220 associated with the user device 105 to the augmented reality application 122. As previously discussed, such ambient environment information 220 can include various information collected regarding the contemporaneous surroundings of the user device 105, such as climate, images, location, biometric information of the user, and other environmental information. In some embodiments the ambient environment information may include information aggregated over a predetermined time interval, for example a daily or weekly routine of a user based on locations the user visits. After receiving the ambient environment information 220, the augmented reality application 122 may be configured to communicate with the augmented reality server 150, and to transmit the ambient environment information 230 to the augmented reality server 150. In some embodiments, the augmented reality application 122 may have the functionality of the augmented reality server 150 stored or be otherwise locally accessible.

The augmented reality server 150 may receive the ambient environment information from the augmented reality application 122 or the user device 105 and may identify a user associated with the user device 105. For example, a user may have registered with the user device 105 or may have logged in to the augmented reality application 122. The augmented reality server 150 may identify a user category associated with the user. For example, the augmented reality server 150 may actively identify a user category each time ambient environment information is received, or may retrieve an associated user category from the trigger database or the marketing message database or another database, for example.

The augmented reality server 150 may identify one or more triggers based at least in part on the ambient environment information. For example, the augmented reality server 150 may access 240 the trigger database 196 to identify one or more triggers contained in the received ambient environment information. In some embodiments, the trigger database 198 may communicate 242 with the augmented reality server 150, while in other embodiments the trigger database 198 may be passive and accessible by the augmented reality server 150. The augmented reality server 150 may identify one or more triggers contained within or associated with the received ambient environment information such as image information, sound information, location information, motion information, climate information, physiological or biological information, scent information, chronological information, optical pulse information, and/or any combination thereof. In instances where the ambient environment information includes image information, the augmented reality server 150 may detect or identify abstract patterns or otherwise discern patterns within the image information to identify one or more triggers. In one example, a pattern may be waves along a beach, as discussed in detail below.

The augmented reality server 150 may access 250 the response action database 198 to determine, based at least in part on the one or more triggers identified, a response action associated with the one or more triggers. In some embodiments, the response action database 198 may communicate 252 with the augmented reality server 150, while in other embodiments the response action database 198 may be passive and accessible by the augmented reality server 150. The augmented reality server 150 may determine response actions such as communicate with the user, deliver an advertisement, deliver a marketing message, send a message, such as an email or a text message, send a reminder, send an alert, send a hyperlink, deliver media such as images or videos, launch an application, retrieve and/or store data, or other response actions or combinations of response actions, in response to the identified triggers. In some embodiments, the response action includes a communication to the user device, where the communication includes a prompt on the user interface of the augmented reality application 122 or the user device 105. In another example, a response action may include a customized offer, specific to the user device 105 or a user, that may be based on a profile associated with the user device 105 or a user. The customized offer may provide the user with an opportunity to execute a transaction without further prompting or input from the user.

In some embodiments, the response action may include determining a marketing message to present to the user via the user device 105 and/or the augmented reality application 122. In such instances, the augmented reality server 150 may access 260 the marketing message database 194 and determine a marketing message to present to the user. In some embodiments, the marketing message may be associated with the one or more triggers identified by the augmented reality server 150, while in other embodiments, the marketing message may be associated with a specific user, based for example on transaction history or other user preferences. In some embodiments, the marketing message database 194 may communicate 262 with the augmented reality server 150, while in other embodiments the marketing message database 194 may be passive and accessible by the augmented reality server 150.

Upon determining a response action, and in some instances determining a marketing message, the augmented reality server 150 may communicate 270 the response action to the augmented reality application 122. The marketing message may be an advertisement, an incentive to purchase, a promotional offer, a standard brand image, a marketing message, or the like. For example, the augmented reality server 150 may communicate instructions to launch or retrieve a video or an advertisement, or to overlay an image, to the augmented reality application 122. In instances where the augmented reality server 150 has identified a marketing message to present to the user, the augmented reality server 150 may transmit 270 the marketing message to the augmented reality application 122, and also transmit 280 the marketing message to a third party device, such as the retailer server 160 for the retailer which the marketing message is associated with. To this end, the user may be able to redeem the marketing message without having a physical coupon, for example, and instead by presenting the augmented reality application 122 to the retailer for verification by the retailer server 160. In other embodiments, the augmented reality server 150 may not transmit 280 the marketing message directly to the retailer server 160.

According to some embodiments, the augmented reality application 122 may receive the response action from the augmented reality server 150, and may prompt the user on a user interface of the augmented reality application 122. Such prompts may include whether the user would like to see more information regarding an overlayed image on the display 140 of the user device 105, whether the user would like to see marketing messages, or other prompts to the user that may be configured for the user to accept or reject.

Referring now to FIG. 3, an example implementation 300 according to embodiments of the disclosure is depicted. In the illustrated implementation 300, a user 302 has a user device 304 at a beach location 310. The beach location 310 may include palm trees 312, sand 314, waves 316, water 318, sun 320, and/or other beach related elements. The user 302 may open the augmented reality application 122 on the user device 304, and point a camera associated with the user device 304 at the beach location 310, such that the camera captures the beach location 310 and the beach scene, for example on a display 330 of the user device 304. The augmented reality application 122 may transmit the image information, along with other ambient environment information as discussed herein, such as location and weather information, to the augmented reality server 150.

The augmented reality server 150 may identify the user 302 associated with the user device 304, for example because the user registered and/or logged in to the augmented reality application 122 on the user device 304. The augmented reality server 150 may identify a user category associated with the user 302, for example a young female, or a physically fit person, or a sports fan, or another user category.

The augmented reality server 150 may identify one or more triggers associated with the received ambient environment information. For example, the augmented reality server 150 may identify the palm trees 312 as a trigger, or the pattern and sound of waves 316 crashing against the sand 314 or beach as a trigger. The augmented reality server 150 may use location or climate information to increase the accuracy of identified triggers in the ambient environment information. The augmented reality server 150 may identify one or more triggers and determined an associated response action, which may be to overlay an image on the display 330 of the device 304, prompt the user, and to provide the user with a marketing message.

Referring now to the close up 332 of the user device 304 in FIG. 3, the augmented reality application 122 may receive the response action from the augmented reality server 150 and, in response, may overlay a virtual image 342 of a three-dimensional jet ski 340 on the realtime image of the waves 316 within the view scope of the camera of the user device 304. The augmented reality application 122 may further prompt the user via a prompt box 350 on the display 330 of the user device 304. The prompt box 350 may prompt the user to view jet skiing videos, for example tutorials or highlights of jet skiers. The augmented reality application 122 may further provide a marketing message 360 to the user 302 by indicating an available marketing message via promotion box 362. The marketing message may include discounts on jet skiing sessions at nearby retailers, for example. The augmented reality application 122 may further include inputs 370 that allow the user 302 options to customize the augmented reality application 122, for example by enabling or disabling use of a microphone to collect ambient environment information related to sound, or to log in to the augmented reality application 122.

Also illustrated in FIG. 3 are close up views of wearables, shown as glasses 380 and watch 390 that the user 302 may be wearing. The glasses 380 may display images similar to the images depicted on the user device 304. For example, the glasses 380 may include a left portion 382 and a right portion 384, and each portion 382, 384 may display the same or similar images as shown on the user device 304. In other embodiments, the images shown in the glasses 380 may be modified or formatted for viewing in the glasses 380. Similarly, watch 390 may have a display 392 that displays images similar to the user device 304. In other embodiments, either the glasses 380 or watch 390 may have independent device components, such as cameras, to implement the systems and methods described herein and may display images based on input from the respective device components. In some embodiments, the wearables 380, 390 may simply reflect images displayed on the user device 304. Additionally depicted in FIG. 3 is a smartpost 396, with display 398 that may include a device component, such as a camera, and may implement the systems and methods described herein. For example, the smartpost 396 may include a camera and may provide dynamic messages directed towards nearby users, such as user 302. FIG. 3 also includes biometric sensor 399, illustrated as an embedded biometric sensor positioned in a shoulder of the user 305. The biometric sensor 399 may be an internal or external sensor configured to capture biometric information from the user 305, such as pulse or other somatic signals. In other embodiments, the biometric sensor 399 may include optical sensors, other implanted sensors, or sensors worn in contact with the skin, such as stickers, chest bands, heart rate monitors, and the like.

Figure 4:
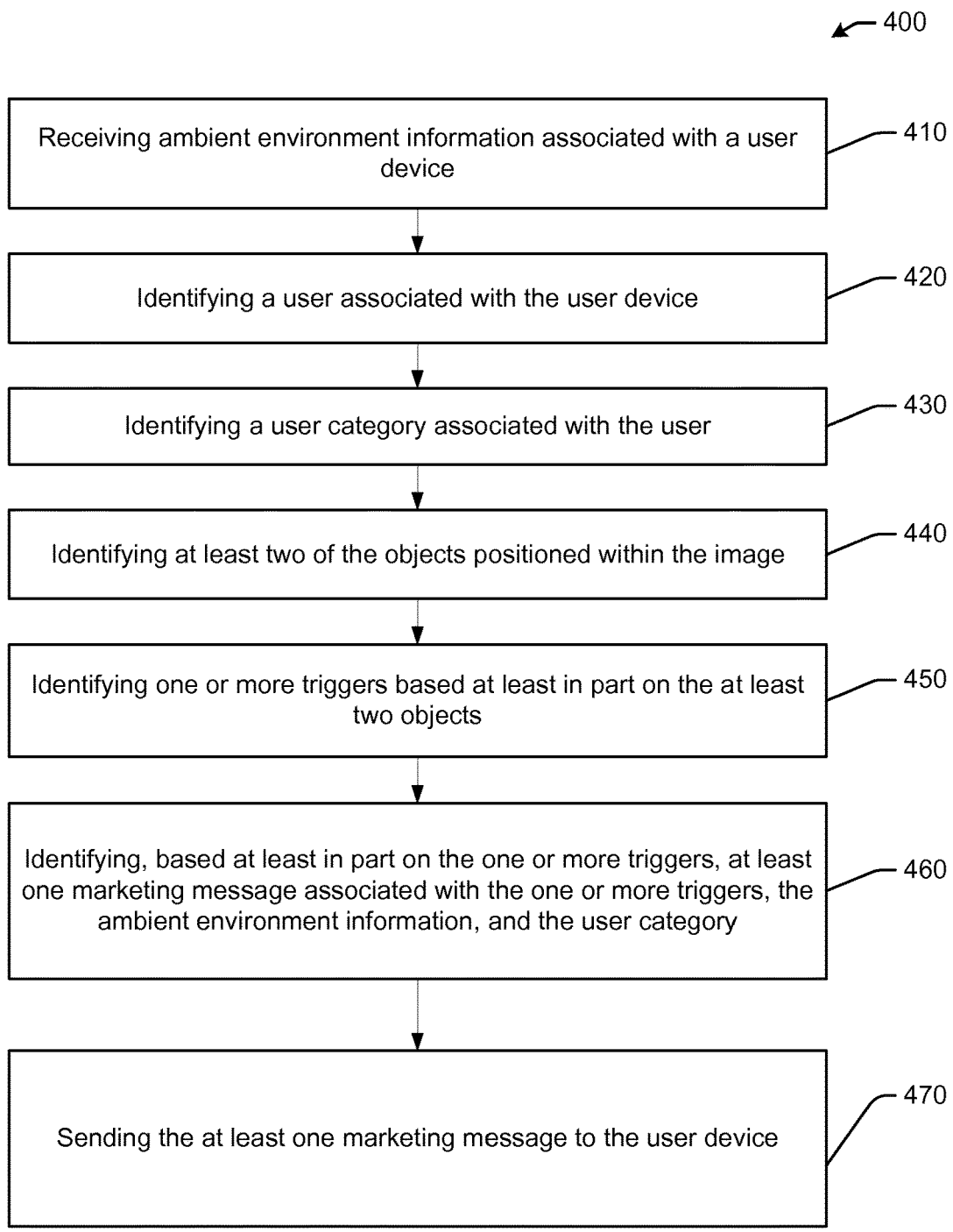
FIG. 4 depicts a flow diagram of a method for delivering content, according to one or more example embodiments.

Referring now to FIG. 4, a flow diagram is illustrated of a method 400 for delivering content in accordance with one or more aspects of the present disclosure. The method 400 may begin at block 410 where a computer system having one or more processors, such as augmented reality server 150, or user device 105, and/or any other suitable device, may receive ambient environment information associated with a user device. At block 420, the augmented reality server 150 may identify a user associated with the user device. At block 430, the augmented reality server 150 may identify a user category associated with the user. At block 440, the augmented reality server 150 may identify at least two of the objects positioned within the image. At block 450, the augmented reality server 150 may identify one or more triggers based at least in part on the at least two objects. At block 460, the augmented reality server 150 may identify, based at least in part on the one or more triggers, at least one marketing message associated with the one or more triggers, the ambient environment information, and the user category. At block 470, the augmented reality server 150 may send the at least one marketing message to the user device.

Content delivered by the system for delivering content 100 may be situational and also may be dependent on the specific mobile device being used with the augmented reality system 100. For example, while videos may be played on smartphones or tablets, an image may be displayed on a smart watch. Additionally, the system 100 may have several marketing messages that are associated with specific parameters or merchants, where each of the marketing messages may be prioritized based on specific mobile devices or specific users of mobile devices. Priority may be determined by activity, transaction history, location, time, weather, or other external factors or information that may be obtained from the mobile device or any component in communication with the system 100.

Certain embodiments of the present disclosure are described above with reference to block and flow diagrams of systems and methods and/or computer program products according to example embodiments of the present disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the present disclosure.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus may create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the present disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the present disclosure have been described in connection with what is presently considered to be the most practical and various embodiments, it is to be understood that the present disclosure is not to be limited to the disclosed embodiments, but is intended to cover various modifications and equivalent arrangements included within the scope of the appended claims. Although specific terms are employed herein, they are used in a generic and descriptive sense only and not for purposes of limitation.

This written description uses examples to disclose certain embodiments of the present disclosure, including the best mode, and also to enable any person skilled in the art to practice certain embodiments of the present disclosure, including making and using any devices or systems and performing any incorporated methods. The patentable scope of certain embodiments of the present disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   receiving, by a computer system comprising one or more processors, ambient environment information associated with a user device having a user interface, the ambient environment information comprises image information for an image having multiple objects positioned within the image, and natural phenomena information associated with a natural phenomenon in an ambient environment of the user device, wherein the natural phenomenon is generated by the ambient environment and comprises at least one of light patterns generated by sunlight, sounds generated by ocean waves, or cloud patterns;
   identifying, by the computer system, a user associated with the user device;
   identifying, by the computer system, a user category associated with the user;
   identifying, by the computer system, at least two of the objects positioned within the image based at least in part on the image information;
   determining, by the computer system, the natural phenomenon;
   identifying, by the computer system, one or more triggers associated with the at least two objects and the natural phenomenon by detecting at least one pattern within the image information to identify the one or more triggers;
   determining a current time of day;
   determining at least one response action in response to the identified one or more triggers, wherein the at least one response action includes a communication to the user device, wherein the communication includes a prompt on the user interface, wherein the prompt includes whether the user would like to see more information regarding an overlaid image on a display of the user device, whether the user would like to see marketing messages, or other prompts to the user that are configured for the user to accept or reject;
   selecting, by the computer system and based at least in part on the one or more triggers and the current time of day, the more information regarding an overlaid image, a marketing message, or the other prompts associated with the one or more triggers, the ambient environment information, and the user category to be included in the determined at least one response action; and
   sending, by the computer system, the communication to the user device for presentation at a predetermined location of the image based at least in part on the response action, wherein the marketing message is selected based at least in part on the current time of day.

2. The method of claim 1, wherein the ambient environment information further comprises information aggregated over a predetermined time interval.

3. The method of claim 1, wherein the ambient environment information further comprises one or more of a sound information, a location information, a motion or orientation information, a climate information, a physiological information, a scent information, a chronological information, or a human biometric information.

4. The method of claim 1, wherein the image information comprises one or more of a captured image, an abstract pattern, or a pattern discerned from a captured image.

5. The method of claim 1, further comprising initiating a response action, wherein the response action comprises one or more of serving content, launching an application, retrieving data, or storing data.

6. The method of claim 5, wherein serving content comprises transmitting, by the computer, one or more of multimedia content, messages, or alerts to the user device.

7. The method of claim 5, wherein the content served by the computer comprises an overlaid virtual advertisement.

8. A user device comprising:
   a user interface;
   at least one memory storing computer-executable instructions; and
   at least one processor configured to execute the computer-executable instructions to:
   transmit, by the user device, ambient environment information of the user device to a computer, wherein the ambient environment information comprises image information for an image having multiple objects positioned within the image, and natural phenomena information associated with a natural phenomenon in an ambient environment of the user device, wherein the natural phenomenon is generated by the ambient environment and comprises at least one of light patterns generated by sunlight, sounds generated by ocean waves, or cloud patterns;
   identify, by a computer, a user associated with the user device;
   identify, by the computer, a user category associated with the user:
   identify, by the computer, at least two of the objects positioned within the image based at least in part on the image information;
   determine, by the computer, the natural phenomenon; and
   identify, by the computer system, one or more triggers associated with the at least two objects and the natural phenomenon by detecting at least one pattern within the image information to identify the one or more triggers;
   receive, by the user device, a response action from the computer in response to the identified one or more triggers, wherein the at least one response action includes a communication to the user device, wherein the communication includes a prompt on the user interface, wherein the prompt includes whether the user would like to see more information regarding an overlaid image on a display of the user device, whether the user would like to see marketing messages, or other prompts to the user that are configured for the user to accept or reject;

execute, by the user device, the response action; and present, by the user device, the more information, a marketing message, or the other prompts at a predetermined location of an image to a user of the user device, based at least in part on the response action, wherein the marketing message is selected based at least in part on a current time of day.

9. The user device of claim 8, wherein the ambient environment information comprises one or more of an image information, a sound information, a location information, a motion information, a climate information, a physiological information, a scent information, a chronological information, or a biometric information.

10. The user device of claim 9, wherein the image information comprises one or more of a captured image, an abstract pattern, or a pattern discerned from a captured image.

11. The user device of claim 8, further comprising aggregating ambient environment information over a predetermined time interval.

12. The user device of claim 8, wherein the response action comprises one or more of serving content, launching an application, retrieving data, or storing data.

13. The user device of claim 12, further comprising receiving, by the user device, one or more of multimedia content, messages, or alerts.

14. A non-transitory computer readable medium storing instructions, that when executed by at least one processor, causes the at least one processor to:

receive ambient environment information associated with a user device having a user interface, wherein the ambient environment information comprises image information for an image having multiple objects positioned within the image, and natural phenomena information associated with a natural phenomenon in an ambient environment of the user device, wherein the natural phenomenon R generated by the ambient environment and comprises at least one of light patterns generated by sunlight, sounds generated by ocean waves, or cloud patterns;

identify a user associated with the user device;

identify a user category associated with the user;

identify at least two of the objects positioned within the image based at least in part on the image information;

determine the natural phenomenon;

identify one or more triggers associated with the at least two objects and the natural phenomenon by detecting at least one pattern within the image information to identify the one or more triggers;

determine current weather based at least in part on the natural phenomenon;

determine at least one response action in response to the identified one or more triggers, wherein the at least one response action includes a communication to the user device, wherein the communication includes a prompt on the user interface, wherein the prompt includes whether the user would like to see more information regarding an overlaid image on a display of the user device, whether the user would like to see marketing messages, or other prompts to the user that are configured for the user to accept or reject;

select, based at least in part on the one or more triggers and the current weather, the more information regarding the overlaid image, a marketing message associated with the one or more triggers, or the other prompts, the ambient environment information, and the user category to be included in the determined at least one response action;

send the communication to the user device; and present the more information, the marketing message, or the other prompts at a predetermined location of the image based at least in part on the response action, wherein the marketing message is selected based at least in part on a current time of day.

15. The computer readable medium of claim 14, wherein the ambient environment information further comprises information aggregated over a predetermined time interval.

16. The computer readable medium of claim 14, wherein the ambient environment information further comprises one or more of a sound information, a location information, a motion or orientation information, a climate information, a physiological information, a scent information, a chronological information, or a human biometric information.

17. The computer readable medium of claim 16, wherein the at least one marketing message is associated with at least two of the ambient environment information.

18. The method of claim 1, further comprising:

determining current weather based at least in part on the natural phenomenon;

wherein selecting the first marketing message is based at least in part on the one or more triggers, the current time of day, and the current weather.

19. The method claim 1, wherein the predetermined location is determined based at least in part on an environmental context of the image.

* * * * *

UNITED STATES PATENT AND TRADEMARK OFFICE
CERTIFICATE OF CORRECTION

PATENT NO. : 10,592,929 B2
APPLICATION NO. : 14/313728
DATED : March 17, 2020
INVENTOR(S) : Fred Steube et al.

Page 1 of 1

It is certified that error appears in the above-identified patent and that said Letters Patent is hereby corrected as shown below:

In the Claims

Claim 14, Column 17, Line number 45, delete "phenomenon R generated" replace with --phenomenon is generated--

Signed and Sealed this
First Day of September, 2020

Andrei Iancu
*Director of the United States Patent and Trademark Office*